Feb. 15, 1944.  J. LEDWINKA  2,342,083
BRAKE MECHANISM
Filed Feb. 11, 1942   3 Sheets-Sheet 1

INVENTOR
Joseph Ledwinka
BY
ATTORNEY

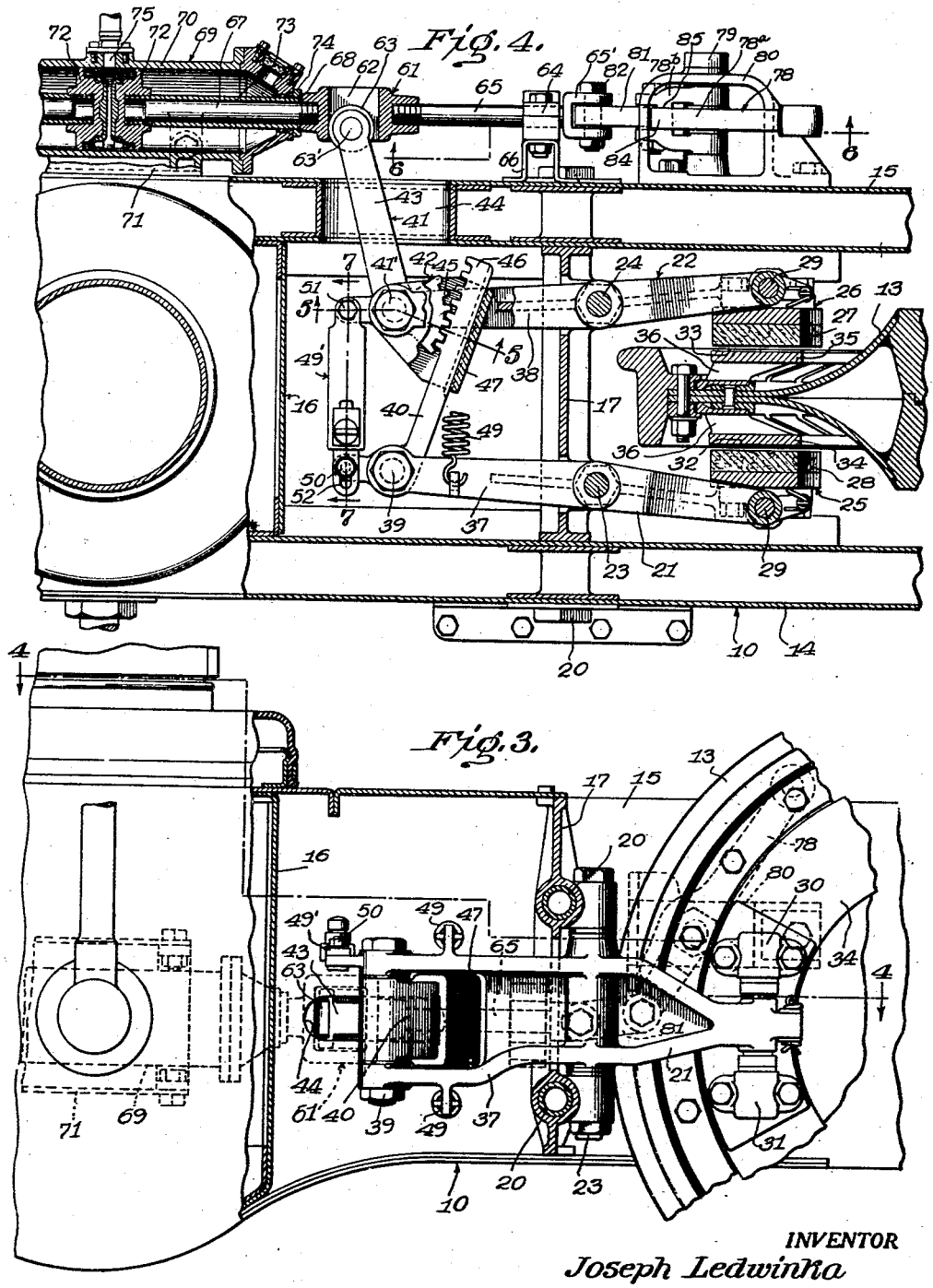

Feb. 15, 1944.　　　　J. LEDWINKA　　　　2,342,083
BRAKE MECHANISM
Filed Feb. 11, 1942　　　3 Sheets-Sheet 3
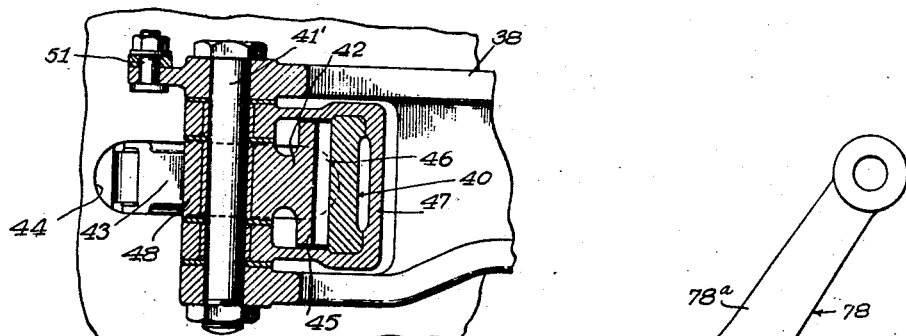
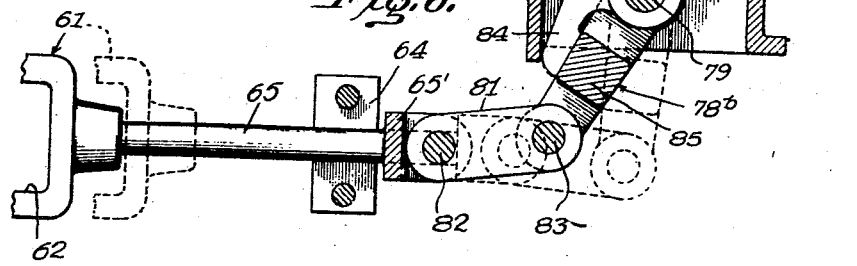
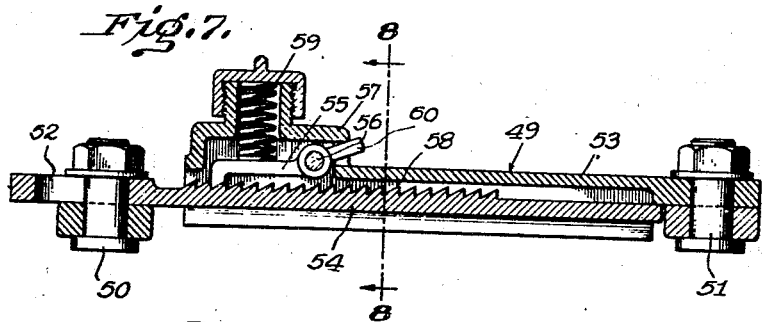
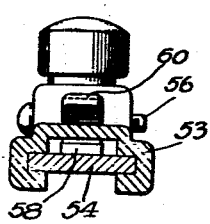
INVENTOR
Joseph Ledwinka
BY
ATTORNEY Patented Feb. 15, 1944

2,342,083

UNITED STATES PATENT OFFICE 2,342,083

BRAKE MECHANISM

Joseph Ledwinka, Philadelphia, Pa., assignor to Budd Wheel Company, Philadelphia, Pa., a corporation of Pennsylvania Application February 11, 1942, Serial No. 430,329

7 Claims. (Cl. 188—59)

The invention relates to brake mechanism, and, more particularly, to such mechanisms adapted to be associated with trucks having tandem wheels arranged between longitudinal girders forming the main members of the truck frame.

It is an object of the invention to provide a simple and inexpensive such brake mechanism, in which the brake parts and their actuating means are readily accessible and readily assembled and disassembled with the truck frame.

It is a further object of the invention to provide simplified actuating means for the brake shoes connected to be actuated either by fluid pressure or manually and to provide actuating means which, for a given applying force, is designed to supply substantially equal pressure to the shoes regardless of wear on the shoes.

These objects are in large part attained by suitably disposing two spaced rotary brake parts on the opposite sides of a wheel and by mounting the brake shoes cooperating therewith and their actuating or brake levers on a transverse member of the truck frame interconnecting the spaced girders and, to provide for the ready dismounting of this transverse member, it is connected to the spaced girders in a manner to permit its ready assembly or disassembly therewith. Other features whereby the objects of the invention are attained are the provision of a novel floating lever and linkage means interconnecting the brake levers of the shoes associated with a wheel for actuating them including a lever projecting laterally through an opening in one of the girders and in the provision of manual and fluid-actuated means mounted on the outside face of said girder and comprising a common longitudinally movable element for operating said laterally projecting lever, said element being under the control of either said manual or said fluid-actuated means. To provide compactness of construction, the fluid-actuated means may comprise a single brake cylinder device disposed longitudinally between the laterally projecting levers forming parts of the brake actuating mechanisms associated with the respective tandem wheels of a truck. Lost motion connections are provided between the fluid-actuated means and the longitudinally movable element and between the manually-actuated means and said element, whereby one may be actuated to apply the brakes without affecting the other. The automatic adjustment for wear of the shoes is attained by an extensible link connecting the brake levers associated with the respective shoes of the mechanism associated with a wheel, said link being automatically extended and held in an extended condition, as the shoes wear, by a one-way device, such as a pawl and ratchet device.

Other and further objects and the manner in which they are attained will become apparent from the following detailed description when read in connection with the accompanying drawings forming a part hereof.

In the drawings:

Fig. 3 is an enlarged fragmentary sectional view through the truck and associated brake mechanism, the section being taken substantially along the line 3—3 of Fig. 1, looking in the direction of the arrows.

Fig. 4 is a similarly enlarged fragmentary sectional plan view, the section being taken substantially along the line 4—4 of Fig. 3, looking in the direction of the arrows.

Figure 1:
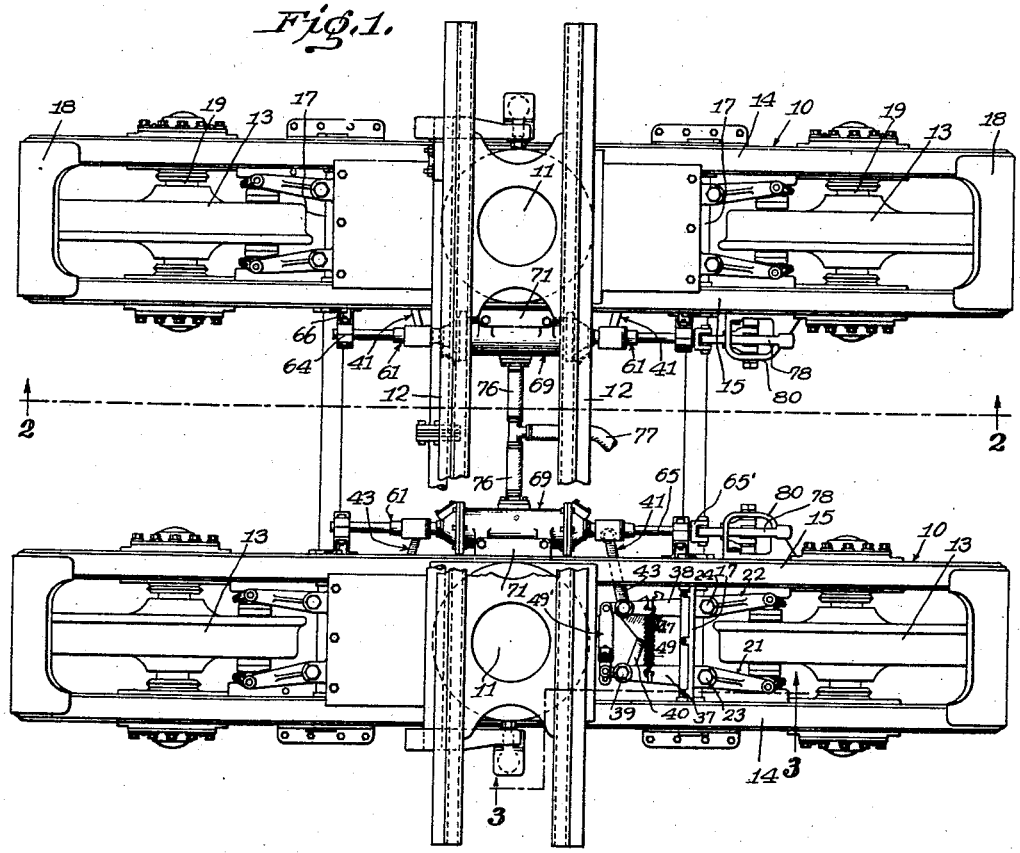
Fig. 1 is a plan view of a truck organization, parts being broken away, showing the invention applied thereto.

Figs. 5, 6 and 7 are enlarged fragmentary sectional views taken, respectively, substantially along the lines 5—5, 6—6 and 7—7 of Fig. 4 looking in the direction of the arrows.

Fig. 8 is a detail sectional view taken substantially along the line 8—8 of Fig. 7 looking in the direction of the arrows.

The brake mechanism of the invention is shown applied to a truck structure of the type shown in my co-pending application Serial No. 417,991, filed November 6, 1941, in which two trucks, as 10, are individually pivotally connected on vertical axes 11 connected to the car body represented by the bolster sills 12 intermediate their ends and carry, adjacent their ends, the independently rotatable wheels, as 13. Since the brake mechanism associated with the respective wheels is substantially the same for each, only one such mechanism is illustrated in detail in the drawings and the description will be mainly limited thereto.

The support of the rotary brake rings from the wheel and the manner of mounting the shoes and their operating or brake levers on the truck frame may be substantially the same as that shown in copending application, Serial No. 419,116, filed November 14, 1941.

As shown, each truck comprises a spaced pair of longitudinally extending, vertically deep, transversely narrow girders or frame members designated 14 and 15, which are interconnected by transverse members 16, 17 and 18. Each wheel 13 is mounted on an axle 19, running in bearings mounted in the girders, to rotate in the space between the girders 14 and 15, and the intermediate transverse member 17 is arranged close to the inner side of the wheel and serves, in addition to providing a strong interconnection between the girders, as a brake support. This intermediate member 17 may be, and preferably is, a casting vertically of substantially the depth of the girders and is readily removably secured with certain of the brake parts assembled therewith, as a unit, to the girders 14 and 15, as by upper and lower through bolts 20.

The brake levers 21 and 22 passing longitudinally through openings in the member 17 are pivoted thereon through vertical pins 23 and 24, respectively, each passing through vertically spaced bearings on member 17 and the hub of the adjacent lever disposed between said spaced bearings. Each of the levers 21 and 22 carries, at its end adjacent the associated wheel 13, a segmental brake shoe. The shoes are designated respectively 25 and 26 and carry the respective friction blocks 27 and 28. Each shoe is secured to its lever by a vertical pin, as 29, passing through the enlarged end of the lever and having its ends mounted in upper and lower bearing caps 30 and 31, bolted to the back of the associated shoe. The shoes 25 and 26 are arranged in cooperative relation to braking faces 32 and 33 on braking rings 34 and 35 secured, respectively, to the opposite sides of the wheel 13, to rotate therewith and permit radial expansion thereof in the manner substantially as shown and described in the aforementioned copending application Serial No. 419,116. The brake rings are further each provided with radial passages 36 for the passage of cooling air.

It is to the following structure for actuating the shoes into braking engagement with the braking surfaces on the wheels that the present invention is primarily directed. The arms 37 and 38 of the levers 21 and 22, which arms project from the opposite side of their pivots from the arms by which the shoes are carried, are interconnected for simultaneous operation by either a fluid-operated brake cylinder device or by a manually-operated actuator as will now be described.

The ends of the arms 37 and 38 of the levers 21 and 22 are preferably bifurcated as shown in Figs. 3 and 5, and between the furcations on arm 37 is pivotally mounted on the pin 39 a link 40. The bifurcated end of lever 38 receives between the furcations thereof the hub of a bent or bellcrank lever 41 mounted on the pin 41'. The bellcrank 41 has a short arm 42 for operative engagement with the link 40 and a long arm 43 which extends laterally through an elongated opening or slot 44 in the adjacent girder 15, the end of the long arm projecting into position for operation by the means to be hereinafter described.

To insure that, for equal actuating forces applied to the arm 43 of the bell crank, the brake shoes 25 and 26 will always be applied with equal pressure to their respective braking faces 32 and 33 associated with the wheel 13, the short arm 42 of the bell crank lever 41 is preferably in the form of a toothed sector 45 which meshes with a rack 46 on the link 40. This connection insures that, for all operative positions of the long arm 43 of the bell crank, and with the application of equal forces thereto, the brake shoes will be applied with substantially equal pressures and this is so regardless of the shoe wear.

To maintain the rack 46 constantly in mesh with the sector 45, the link 40 is guided within a U-shaped yoke 47 pivoted on the pin 42 at the opposite sides of the hub 48 of the lever 41, see Fig. 5.

The brake shoes are returned to inoperative position after braking engagement by suitable means such as tension springs 49 interconnecting the arms 37 and 38 of the brake levers 21 and 22. To limit this return movement under the action of the springs 49, a suitable stop device may be provided. According to the invention this stop device may comprise a link designated generally by reference numeral 49' pivoted to short extensions from the free ends of the lever arms 37 and 38 respectively by the pins 50 and 51. This link has a lost motion connection, as by a slot 52 with at least one of the pins, as pin 51, this slot being of a length to allow the required return of the shoes to properly space them from each other and the braking faces when the brakes are not applied.

To prevent undue spacing of the returned shoes as the brake linings 27 and 28 become worn, the link 49' is constructed to provide automatic adjustment of its length as the shoes wear. To this end, the link is preferably constituted of two telescoping parts 53 and 54, see Fig. 7, which parts are free to be extended but prevented from collapsing under normal operation, by a pawl and ratchet device. This device may consist, as shown, of a pawl 55 pivotally mounted at 56 in a housing at the free end of the part 53, the pawl being urged to its operative position engaging a ratchet 58 on part 54 through the coil spring 59. With this arrangement, it will be seen that, as the shoes wear, the pawl will pass over the teeth of the ratchet and lock behind a succeeding tooth. In order to enable the extendible link to be manually collapsed, the pawl 55 has an arm 60 extending through an opening to the outside of the housing 57.

All of the parts of the brake mechanism so far described, except the parts rotating with the wheel may be and preferably are, assembled as a unit on the transverse member 17 and, as a unit assembled or disassembled with the girders 14 and 15 of the truck frame in a manner generally similar to that fully disclosed and claimed in the copending application, hereinbefore referred to, Serial No. 419,116.

The means arranged on the outer face of the girder 15, for actuating the floating lever 41 and, therefore, the brake mechanism associated therewith and clearly shown in Figs. 1, 2, 4 and 6 will now be described.

Such means may comprise a longitudinally slidable member, as 61, having a central enlargement with a transverse slot 62 therein to receive the end of the arm 43 of lever 41. The slot is provided with wide end faces forming abutments for engagement with the end of the lever arm and to permit free transverse movement of the end of the arm across the end faces of the slot it is provided with a roller 63 mounted on a vertical pin 63' passing through the bifurcated end of the arm. This provides a slip connection permitting ready attachment to and detachment from the longitudinally slidable member 61 by the bell crank arm 43.

Figure 2:
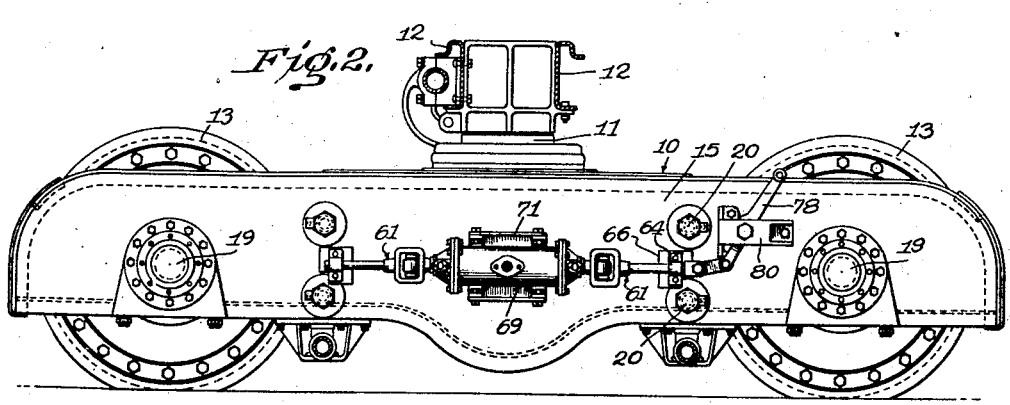
Fig. 2 is a central longitudinal vertical sectional view thereof, the section being taken substantially along the line 2—2 of Fig. 1 looking in the direction of the arrows.

This longitudinally slidable member 61 may be actuated either by fluid-actuated means or by manual means, and is guided for longitudinal movement by spaced brackets projecting from the vertical face of the girder 15. One such bracket comprises a bearing 64 slidingly receiving a reduced extension 65 of the member 61 and bolted to a bracket 66 in turn secured to the face of the girder, as by welding. At its opposite end toward the center of the truck, the member 61 is formed with a reduced extension 67 forming a shoulder 68, this reduced extension being guided for longitudinal sliding movement by a bracket in the form of a brake cylinder device designated generally by the reference numeral 69. As shown in Fig. 2, this cylinder device is secured centrally of the girder 15 by having the cylinder casing 70 thereof bolted to a bracket 71 secured to the girder, as by welding. In the present embodiment, the cylinder casing has two oppositely movable pistons 72 therein each of which has a sleeve-like rod 73 extending outwardly through the adjacent head of the cylinder. This sleeve-like rod 73 has a collar 74 on its outer end limiting the inward movement of the piston and arranged to engage the shoulder 68 on the member 61 to actuate it when the piston is moved outwardly by the fluid pressure. Fluid pressure may be admitted between the two pistons of the cylinder through the port 75. The ports on the cylinders 69 on the opposite trucks may be connected by flexible pipes 76 to a common supply pipe 77 for fluid under pressure. In this way equal pressure is supplied to operate all the pistons and the brake mechanisms associated with each wheel, when the pipe is supplied with fluid under the desired pressure in a usual manner from an operator's control station.

Each of the brake mechanisms associated with the respective wheels may also be arranged to be manually operated independently or conjointly with the fluid pressure means. In the drawings, Fig. 1, the brake mechanism associated with but two of the wheels is shown so provided with manual means but it is obvious that the other two might be similarly provided and obviously all the manual means could be connected to be operated simultaneously by a suitable equalizing system (not shown).

The means for manually actuating the brake mechanism associated with a wheel may comprise a lever 78 pivoted on a horizontal pin 79 secured in a bracket 80 bolted or otherwise rigidly secured to the side of the girder 15 outwardly beyond the guiding bracket 64, 65. To operate the sliding member 61 from the manually operated lever 78, the end of the reduced extension 65 beyond bearing 64 is provided with a U-shaped head 65' which is connected to the lever 78 by a link 81. As clearly shown in Fig. 6, this link is pivoted to the head 65 by a pin 82 and to the lower arm of the lever 78 by a pin 83.

To avoid operation of the lever 78 and its connections for operating it manually when the fluid-actuated means is utilized to operate the brakes, the lever is provided with a lost motion connection. This is achieved by dividing the lever into two parts 78a and 78b, both pivoted on the pin 79. The portion of the lever 78b alone is connected to the link 81, the other portion 78a having a short extension 84 beyond its pivot bearing against a transverse bar connecting the spaced bars of part 78b to actuate it when the lever 78 is manually actuated. At other times the lower part 78b is free to move away from its engagement with part 78a, as indicated in dotted lines in Fig. 6.

Due to the sliding telescopic connection between the extension 67 of member 61 and the piston rod sleeve 73, the piston 72 may remain stationary during the manual actuation. Thus the longitudinally slidable actuator 61 may be independently operated to apply the brakes either manually or through the fluid actuated means, or they may be employed jointly to actuate it.

The operation of the brake mechanism is believed clear from the foregoing description and further description of its operation is therefore deemed unnecessary.

Though only a single form of the invention is illustrated and described, the invention is not limited thereto but may be embodied in various forms as desired. As various changes in construction and arrangement of parts may be made without departing from the spirit of the invention as will be apparent to those skilled in the art, reference will be had to the appended claims for a definition of the limits of the invention.

What is claimed is:

1. In a truck having spaced side girders between which is rotatably mounted a wheel to be braked, brake mechanism for said wheel comprising a pair of rotary braking faces disposed on opposite sides of the wheel, a pair of brake shoes arranged in cooperative relation to the respective faces and carried respectively by brake levers pivoted intermediate their ends on a support, and actuating means for said levers including a bent lever pivoted to the end of one of the brake levers and having long and short arms, the short arm comprising a gear sector engaging a rack held in operative relation to the sector and formed on a link pivotally connected to the adjacent end of the other brake lever.

2. In a truck having spaced side girders between which is rotatably mounted a wheel to be braked, brake mechanism for said wheel arranged in large part between the girders and including cooperating rotary and non-rotary braking elements and actuating means therefor to apply the brakes, said actuating means including a lever having an end thereof projecting through an opening in one girder to the outside thereof, a slotted longitudinally slidable element mounted on the outside of said girder and receiving the projecting end of said lever in said slot for actuating the same, and separate fluid pressure and manual means for moving said longitudinally slidable element and each having a lost motion connection therewith.

3. In a truck having spaced side girders between the ends of which are rotatably mounted a pair of wheels arranged in tandem, brake mechanisms associated with each of the wheels and arranged for the most part between said girders, each said mechanisms including an actuating lever projecting laterally through an opening in one of said girders to the outside thereof, and brake cylinder means arranged between the projecting ends of said levers for actuating the same to apply the brakes to both wheels simultaneously.

4. In a truck having spaced side girders between which is rotatably mounted a wheel to be braked, brake mechanisms associated with said wheels and arranged for the most part between the girders, said mechanisms including an actuating lever projecting laterally through an opening in one of said girders, said projecting end of the lever being provided with an anti-friction roller and being disposed in a transverse slot of a longitudinally slidable member mounted on said girder, and means of actuating said slidable member to apply the brakes.

5. In a truck having spaced side girders between which is rotatably mounted a wheel to be braked, a supporting member extending between said girders adjacent said wheel, a brake mechanism including a pair of brake levers pivoted on said supporting member and having a pair of brake shoes mounted on the ends thereof adjacent said wheel, an actuating lever connected to said brake levers and projecting laterally through an opening in one of said girders, a slotted element movably mounted on the outside of said girder and receiving the projecting end of said actuating lever in the slot thereof, a fluid pressure cylinder and piston for operating said longitudinally movable member, a lost-motion connection between said member and said piston, a hand lever supported on said girder and a lost-motion connection between said hand lever and said movable member to permit the selective operation thereof by said fluid pressure cylinder or said hand lever.

6. In a truck having spaced side girders between which is rotatably mounted a wheel to be braked, brake mechanism for said wheel comprising a pair of rotary braking faces disposed on opposite sides of the wheel, a pair of brake shoes arranged in cooperative relation to the respective faces and carried respectively by brake levers pivoted intermediate their ends on a support, actuating means for said levers including an actuating lever pivoted to the end of one of said brake levers and having long and short arms, the short arm comprising a gear sector engaging a rack held in operative relation to the sector and formed on a link pivotally connected to the adjacent end of the other brake lever, said actuating lever projecting laterally through an opening from one of said girders, a slotted element movably mounted on the outside of said girder and receiving the projecting end of said lever in the slot thereof, fluid pressure means having a lost-motion connection with said slotted element, and a hand lever supported on said girder and having a lost-motion connection with said element, whereby said element can be selectively operated by said fluid pressure means or said hand lever.

7. In a truck having spaced side girders between which is rotatably mounted a wheel to be braked, a detachable transverse member interconnecting and detachably secured to said girders, brake mechanism for said wheel comprising a pair of rotary braking faces connected to said wheel, a pair of brake shoes arranged in cooperative relation to the respective faces, a pair of brake levers supporting said brake shoes, means for pivotally supporting said levers intermediate their ends on said transverse member, a brake-operating rod slidably mounted on one of said girders and extending longitudinally thereof, and an actuating lever connected to said brake levers, extending through one of said girders and having a slip connection with said rod to permit removal of said brake levers, shoes and actuating lever upon detachment and removal of said transverse member.

JOSEPH LEDWINKA.